United States Patent
Tu et al.

(10) Patent No.: US 10,067,363 B2
(45) Date of Patent: Sep. 4, 2018

(54) POLARIZER AND POLARIZATION MODULATION SYSTEM

(71) Applicant: Huawei Technologies Co., Ltd., Shenzhen (CN)

(72) Inventors: Xin Tu, Shenzhen (CN); Hongyan Fu, Shenzhen (CN); Wanyuan Liu, Wuhan (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/187,328

(22) Filed: Jun. 20, 2016

(65) Prior Publication Data

US 2017/0023808 A1     Jan. 26, 2017

Related U.S. Application Data

(63) Continuation of application No. PCT/CN2013/090151, filed on Dec. 20, 2013.

(51) Int. Cl.
*G02B 6/26* (2006.01)
*G02F 1/01* (2006.01)
(Continued)

(52) U.S. Cl.
CPC ........... *G02F 1/0136* (2013.01); *G02B 6/126* (2013.01); *G02B 6/2813* (2013.01);
(Continued)

(58) Field of Classification Search
USPC ...................................................... 385/2, 40
See application file for complete search history.

(56) References Cited

U.S. PATENT DOCUMENTS

| 5,630,004 A | * | 5/1997 | Deacon | ................... G02F 1/011 385/10 |
| 6,522,799 B1 | | 2/2003 | Bazylenko et al. | |

(Continued)

FOREIGN PATENT DOCUMENTS

| CN | 1800895 A | 7/2006 |
| CN | 101021598 A | 8/2007 |

(Continued)

OTHER PUBLICATIONS

Rahman, B.M.A., et al.,"Design of Optical Polarization Splitters in a Single-Section Deeply Etched MMI Waveguide", Applied Physics B, Oct. 2001, vol. 73, No. 5-6, pp. 613-618.
(Continued)

*Primary Examiner* — Eric Wong
(74) *Attorney, Agent, or Firm* — Slater Matsil, LLP (57) ABSTRACT

Embodiments provide a polarizer and a polarization modulation system. The polarizer includes at least one MMI multi-mode waveguide, where one side of each MMI multi-mode waveguide is connected to an input waveguide, and the other side is connected to an output waveguide. An end portion of the side, on which the output waveguide is located, of the MMI multi-mode waveguide is provided with an adjustable portion, and the adjustable portion is connected to the output waveguide. The polarizer further includes a controller connected to the adjustable portion, where the controller is configured to perform control to change a material property of the adjustable portion, so that the output waveguide outputs optical signals in different polarization states.

20 Claims, 7 Drawing Sheets

(51) Int. Cl.
*G02B 6/126* (2006.01)
*G02B 6/28* (2006.01)
*G02F 1/025* (2006.01)
*G02F 1/095* (2006.01)

(52) U.S. Cl.
CPC ............ *G02F 1/0147* (2013.01); *G02F 1/025* (2013.01); *G02F 1/095* (2013.01); *G02F 2201/05* (2013.01); *G02F 2201/58* (2013.01); *G02F 2202/10* (2013.01); *G02F 2202/105* (2013.01); *G02F 2203/07* (2013.01)

(56) References Cited

U.S. PATENT DOCUMENTS

| | | |
|---|---|---|
| 2003/0091287 A1 | 5/2003 | Lam et al. |
| 2004/0170351 A1* | 9/2004 | Fishman ............... G02F 1/3136 385/3 |
| 2005/0175281 A1* | 8/2005 | Thapliya ................. G02F 1/225 385/28 |
| 2005/0201715 A1* | 9/2005 | Ellwood, Jr. ........ G02B 6/2746 385/147 |
| 2006/0126989 A1 | 6/2006 | Glebov |
| 2006/0274988 A1 | 12/2006 | Doi et al. |
| 2007/0140612 A1 | 6/2007 | Doi et al. |
| 2013/0142474 A1 | 6/2013 | Dallesasse et al. |

FOREIGN PATENT DOCUMENTS

| | | |
|---|---|---|
| CN | 102841407 A | 12/2012 |
| CN | 103148787 A | 6/2013 |
| CN | 103424893 A | 12/2013 |
| EP | 1302793 A2 | 4/2003 |
| EP | 1308772 A2 | 5/2003 |
| JP | 2001183710 A | 7/2001 |
| JP | 2002026820 A | 1/2002 |
| JP | 2002540452 A | 11/2002 |
| JP | 2003329986 A | 11/2003 |
| JP | 2009300888 A | 12/2009 |

OTHER PUBLICATIONS

Swillam, M. A., et al., "Efficient Design of Integrated Wideband Polarization Splitter/Combiner", Journal of Lightwave Technology, vol. 28, No. 8, Apr. 15, 2010, pp. 1176-1183, XP011304104.

Wu, X. et al., "Low Electric Power Drived Thermo-optic Multimode Interference Switches with Tapered Heating Electrodes", Optics Communications, vol. 258, No. 2, Aug. 15, 2005, pp. 135-143, XP029606474.

Yuan, W. et al., "An MMI-based Polarization Splitter Using Patterned Metal and Tilted Joint", 2012 38th European Conference and Exhibition on Optical Communications, OSA, Sep. 16, 2012, 3 pages, XP032544112.

Baojun, L. et al., "3×2 Integrated Microphotonic Switches", Proceedings of the International Society for Optical Engineering (SPIE), vol. 5625, Feb. 28, 2005, 22 pages.

Younghyun, K. et al., "Ge-rich SiGe-on-insulator for Waveguide Optical Modulator Application Fabricated by Ge Condensation and SiGe Regrowth", Optics Express, vol. 21, No. 17, Aug. 13, 2013, pp. 19615-19623, XP055307167.

* cited by examiner

POLARIZER AND POLARIZATION MODULATION SYSTEM

CROSS-REFERENCE TO RELATED APPLICATIONS

This application is a continuation of International Application No. PCT/CN2013/090151, filed on Dec. 20, 2013, which is hereby incorporated by reference in its entirety.

TECHNICAL FIELD

The present invention relates to communications technologies, and in particular, to a polarizer and a polarization modulation system.

BACKGROUND

As transmission capacities and rates of telecommunications network backbones constantly increase, fiber optic communication becomes a main transmission means of a modern information network. A photonic integrated circuit (PIC) chip is an important optical switching module. Because a cross section of an optical fiber is not strictly circular and the optical fiber may be affected by another factor such as a stress, polarization states of optical signals that enter the PIC chip from the optical fiber are uncertain. When these optical signals whose polarization states are uncertain directly pass through the PIC chip, an unignorable polarization dependent loss (PDL) and polarization mode dispersion (PMD) are caused, thereby reducing a signal-to-noise ratio of a system. Currently, to ensure transmission quality of a signal and eliminate impact of polarization, the PIC chip needs to separately process optical signals in different polarization states, where by using a technology such as a polarizer, a transverse electric wave (TE) mode and a transverse magnetic wave (TM) mode in the chip are separated into two optical paths for separate processing. A waveguide polarizer is an indispensable component of the PIC chip. Based on a principle that the TE mode and the TM mode have different propagation constants, different cut-off wavelengths, different coupling lengths, or the like, the waveguide polarizer allows only an optical signal in one polarization state (TE mode or TM mode) to pass through and blocks propagation of an optical signal in the other polarization state or absorbs an optical signal in the other polarization state.

In short, an existing waveguide polarizer generally can only produce polarized light in a fixed direction, that is, once designed and processed, the waveguide polarizer can only implement a polarization function of the TE mode or the TM mode. If optical signals in different polarization states are required, the only method is to first split original optical signals, and then install a polarizer for a required polarization state on each optical path. An implementation system is complex.

SUMMARY

Embodiments provide a polarizer and a polarization modulation system, so as to implement adjustable polarization and simple structure.

According to a first aspect, a polarizer is provided, including at least one MMI multi-mode waveguide, where one side of each MMI multi-mode waveguide is connected to an input waveguide, and the other side is connected to an output waveguide. An end portion of the side, on which the output waveguide is located, of the MMI multi-mode waveguide is provided with an adjustable portion, and the adjustable portion is connected to the output waveguide. The polarizer further includes a controller connected to the adjustable portion, where the controller is configured to perform control to change a material property of the adjustable portion, so that the output waveguide outputs optical signals in different polarization states.

With reference to the first aspect, in a first optional implementation manner, the material property of the adjustable portion includes one or more of the following: a refractive index of the adjustable portion, a magnetic conductivity of the adjustable portion, and a light transmittance of the adjustable portion.

With reference to the first aspect, in a second optional implementation manner, the material property of the adjustable portion includes an absorption rate of the adjustable portion.

With reference to the first aspect and the first optional implementation manner, in a third optional implementation manner, the adjustable portion includes an electrode and a p-i-n junction; and the controller is configured to change a refractive index, a magnetic conductivity, and/or a light transmittance of an area of the p-i-n junction of the adjustable portion by applying an electric field to the electrode.

With reference to the first aspect and the second optional implementation manner, in a fourth optional implementation manner, the adjustable portion includes an electrode and a p-i-n junction. The controller is configured to change an absorption rate of an area of the p-i-n junction of the adjustable portion by applying an electric field to the electrode.

With reference to the first aspect and the third and fourth optional implementation manners, in a fifth optional implementation manner, the p-i-n junction includes a SiGe alloy, and the SiGe alloy has a length range of 25 to 35 microns and a width range of 5 to 7 microns.

With reference to the first aspect and the fifth optional implementation manner, in a sixth optional implementation manner, the SiGe alloy is 29 microns long and 6.5 microns wide.

With reference to the first aspect and the first optional implementation manner, in a seventh optional implementation manner, the adjustable portion includes a thermo-optical material; and the controller is configured to change a refractive index, a magnetic conductivity, and/or a light transmittance of the thermo-optical material by applying a temperature field to the thermo-optical material; or the adjustable portion includes a magneto-optical material; and the controller is configured to change a refractive index, a magnetic conductivity, and/or a light transmittance of the magneto-optical material by applying a magnetic field to the magneto-optical material.

With reference to the first aspect and the second optional implementation manner, in an eighth optional implementation manner, the adjustable portion includes a thermo-optical material; and the controller is configured to change an absorption rate of the thermo-optical material by applying a temperature field to the thermo-optical material; or the adjustable portion includes a magneto-optical material; and the controller is configured to change an absorption rate of the magneto-optical material by applying a magnetic field to the magneto-optical material.

With reference to the first aspect and the foregoing possible implementation manners, in a ninth optional implementation manner, when the polarizer includes at least two MMI multi-mode waveguides, the polarizer includes at least two sub-polarizers, where each of the sub-polarizers includes one MMI multi-mode waveguide, one input waveguide, and one output waveguide; and the at least two sub-polarizers are cascaded.

According to a second aspect, a polarization modulation system is provided, including the polarizer in any one of the implementation manners of the embodiments. The polarization modulation further includes an encoder, a polarization beam splitter, a differentiator, and a photoelectric detector, where the encoder, the polarizer, the polarization beam splitter, the differentiator, and the photoelectric detector are sequentially connected.

Technical effects of the polarizer and the polarization modulation system according to the present invention are as follows: By disposing an adjustable portion in an MMI multi-mode waveguide, and by using a controller to change a material property of the adjustable portion, an output waveguide outputs optical signals in different polarization states, thereby implementing that a same polarizer can output optical signals in different polarization states, for example, the polarizer not only can output an optical signal in a TE polarization state, but also can output the optical signal in a TM polarization state. Compared with the prior art, adjustable polarization is implemented. Moreover, in the polarizer according to the present invention, only one MMI multi-mode waveguide needs to be disposed between an input waveguide and an output waveguide, and the structure is simple.

DETAILED DESCRIPTION OF ILLUSTRATIVE EMBODIMENTS

Figure 1:
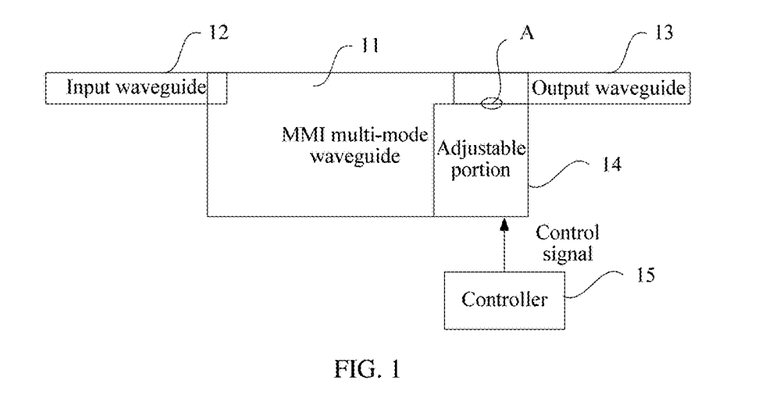
FIG. 1 is a schematic structural diagram of an embodiment of a polarizer.

According to embodiments, by improving a polarizer structure, a polarizer is designed, so as to implement that a same polarizer can output optical signals in different polarization states. Reference may be made to FIG. 1. FIG. 1 is a schematic structural diagram of an embodiment of a polarizer according to the present invention. A structure of the polarizer is schematically briefly illustrated by using FIG. 1.

The polarizer includes at least one multi-mode interference (MMI) multi-mode waveguide. A waveguide refers to an apparatus that transmits an electromagnetic wave in a microwave band or a lightwave band and is used in radio fields such as the field of radio communications, the field of radars, and the field of navigation. The foregoing MMI waveguide is a wide waveguide device, in which an interference effect may occur in propagated optical signals in multiple lightwave modes, thereby outputting the optical signals at different end positions. FIG. 1 first shows a structure including only one MMI multi-mode waveguide. One side of each MMI multi-mode waveguide 11 is connected to an input waveguide 12, and the input waveguide 12 is configured to input an optical signal in any polarization state; and the other side of the MMI multi-mode waveguide 11 is connected to an output waveguide 13, and the output waveguide 13 is configured to output an optical signal.

In this embodiment, an end portion of the side, on which the output waveguide 13 is located, of the MMI multi-mode waveguide 11 is provided with an adjustable portion 14. Moreover, it may be seen from FIG. 1 that the adjustable portion 14 is in contact with and connected to the output waveguide 13, referring to a connection portion A. The MMI multi-mode waveguide 11, the input waveguide 12, the output waveguide 13, and the adjustable portion 14 are prepared on a semiconductor wafer (for example, silicon on an insulator) by using a standard complementary metal oxide semiconductor (CMOS) technology, and cling to each other on a same layer of planar waveguide. The polarizer further includes a controller 15 connected to the adjustable portion 14. Referring to an arrow shown in FIG. 1, the controller 15 is connected to the adjustable portion 14 by means of a metal conducting wire or a metal pin on a chip. The controller 15 may apply a control signal to the adjustable portion 14 (in this embodiment of the present invention, a manner of connection between the controller 15 and the adjustable portion 14 is not limited as long as the control signal can be applied), to perform control to change a material property of the adjustable portion 14, so that the output waveguide 13 outputs optical signals in different polarization states.

Specifically, the foregoing material property of the adjustable portion 14 may be, for example, a refractive index or an absorption rate of the adjustable portion, that is, a change in the refractive index or the absorption rate can change a polarization state of an output optical signal. In specific implementation, other properties (such as a magnetic conductivity and a light transmittance) of the adjustable portion besides the refractive index or absorption rate may also be changed as long as a polarization state of an optical signal output by the output waveguide can be changed. A common material of the adjustable portion includes an alloy of silicon, a III-V compound, a high optical nonlinear compound, and the like.

An optional example is as follows: When the controller applies no control signal, the output waveguide 13 outputs an optical signal in a TE polarization state; and when the controller applies a control signal to the adjustable portion 14, a refractive index of the adjustable portion 14 is changed, so that the output waveguide 13 outputs an optical signal in a TM polarization state. In this way, adjustability of polarization of the polarizer is implemented.

In this embodiment, the polarizer may include at least one MMI multi-mode waveguide, for example, the polarizer may include two, three, four, or even more MMI multi-mode waveguides. However, it should be noted that, when at least two MMI multi-mode waveguides are included, different from the prior art, an adjustable portion in each of the MMI multi-mode waveguides is connected to the controller.

Figure 2:
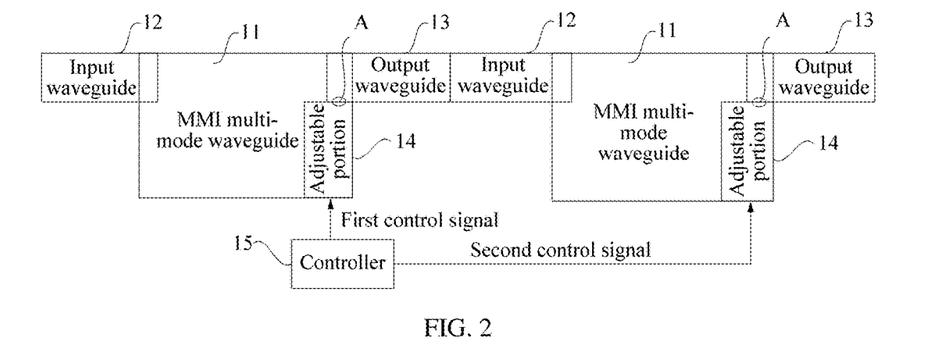
FIG. 2 is a schematic structural diagram of another embodiment of a polarizer.

FIG. 2 is a schematic structural diagram of another embodiment of a polarizer. FIG. 2 shows an optional structure including two MMI multi-mode waveguides. Specifically, in this case, the polarizer may include two sub-polarizers. Each sub-polarizer includes one MMI multi-mode waveguide, one input waveguide, and one output waveguide, and a structure of each sub-polarizer is the same as the structure shown in FIG. 1. The two sub-polarizers are cascaded, that is, referring to FIG. 2, an input waveguide of a sub-polarizer on the right side is connected to an output waveguide of a sub-polarizer on the left side. In this case, an optical signal that is output from the sub-polarizer on the left side may be used as an optical signal that is input to the sub-polarizer on the right side. The polarizer is disposed to have such a structure in which multiple sub-polarizers are cascaded, so that the polarizer can have a better polarization extinction ratio effect. As shown in FIG. 2, the sub-polarizers in which the two MMI multi-mode waveguides are separately located may share a controller. The controller may apply a first control signal to one sub-polarizer, and apply a second control signal to the other sub-polarizer. The first control signal and the second control signal are the same. For example, the controller may apply a first control signal to one sub-polarizer, so that the sub-polarizer outputs an optical signal in a TE polarization state; and the controller applies a second control signal that is the same as the first control signal to the other sub-polarizer, so that the sub-polarizer outputs an optical signal that is in a TE polarization state and has a better polarization extinction ratio. It should be understood that, a manner of connection between multiple sub-polarizers may be a well-known connection manner, which is not described in detail in this embodiment.

According to the polarizer in the embodiments, by disposing an adjustable portion in an MMI multi-mode waveguide, and by using a controller to change a material property, such as a refractive index, an absorption rate, a magnetic conductivity, or a light transmittance, of the adjustable portion, an output waveguide outputs optical signals in different polarization states, thereby implementing that a same polarizer can output optical signals in different polarization states, for example, the polarizer not only can output an optical signal in a TE polarization state, but also can output the optical signal in a TM polarization state. Compared with the prior art, adjustable polarization is implemented. Moreover, in the polarizer according to the present invention, only one MMI multi-mode waveguide needs to be disposed between an input waveguide and an output waveguide; and the structure is simple and the costs are low.

For the adjustable portion in the polarizer, there are various setting materials or setting manners. The following lists several selectable structures of the adjustable portion, and the structures are all described by using an example in which the polarizer includes only one MMI multi-mode waveguide. However, it should be understood that specific implementation is not limited thereto.

Embodiment 1

Figure 3:
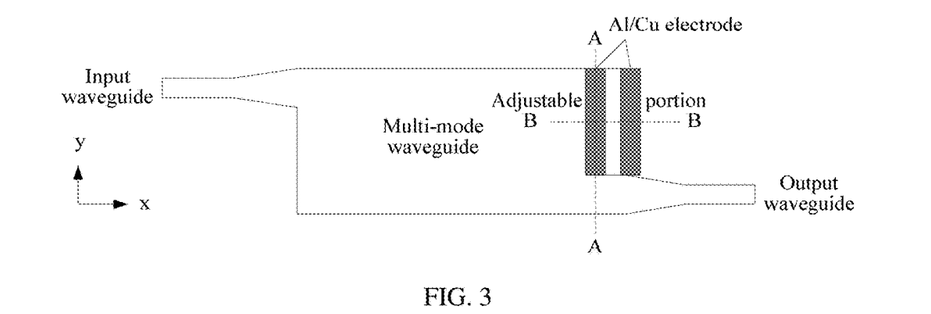
FIG. 3 is a schematic structural diagram of still another embodiment of a polarizer.
Figure 4:
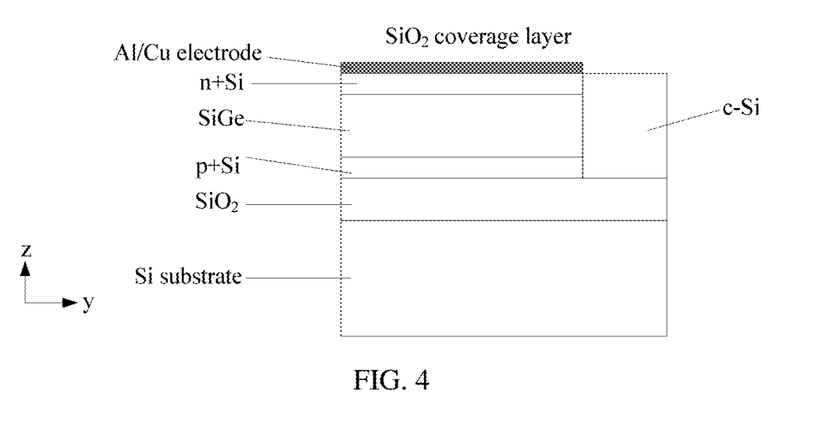
FIG. 4 is a sectional view along an A-A direction in FIG. 3.
Figure 5:
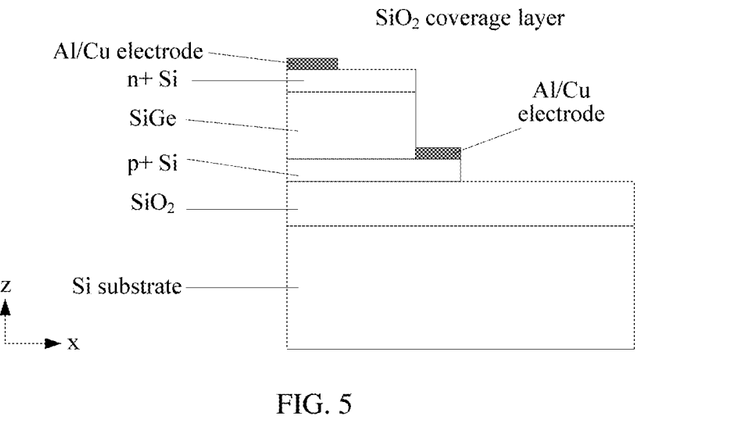
FIG. 5 is a sectional view along a B-B direction in FIG. 3.

FIG. 3 is a schematic structural diagram of still another embodiment of a polarizer, FIG. 4 is a sectional view along an A-A direction in FIG. 3, and FIG. 5 is a sectional view along a B-B direction in FIG. 3. An adjustable portion in this embodiment is provided with an electrode, and a controller may change an absorption rate of the adjustable portion by applying an electric field to the electrode. Moreover, in this embodiment, the adjustable portion is disposed to have a structure of a semiconductor p-i-n junction. The controller may be a programmable current source, such as an NI PXI programmable power module, or an iC-NZP series chip.

With reference to FIG. 3 to FIG. 5, specifically, each of an input waveguide, an output waveguide, and a multi-mode waveguide (an MMI multi-mode waveguide) is a 3-micron-thick silicon layer (that is, crystalline silicon c-Si), and there are a 2-micron-thick $SiO_2$ layer and a several-millimeter-thick silicon substrate below the silicon layer. To reduce an insertion loss caused by a mode mismatch, in this embodiment, the input waveguide and the output waveguide each include a straight waveguide that is 50 microns long, 3 microns high, and 1 micron wide and a tapered waveguide that is 50 microns long, 3 microns high, and 1 micron to 1.5 microns wide in linear growth. The multi-mode waveguide is 602 microns long, 3 microns high, and 8 microns wide.

The adjustable portion in this embodiment is a rectangular SiGe alloy having a length range of 25 microns to 35 microns and a width range of 5 microns to 7 microns. Optionally, the SiGe alloy is 29 microns long and 6.5 microns wide. Certainly, the SiGe alloy is used as an example herein, and in specific implementation, another semiconductor material having an electro-absorption effect may also be used. Moreover, the length of 25 to 35 microns and the width of 5 to 7 microns may also be changed, for example, the length is 19 to 30 microns and the width is 4.5 to 7 microns, but in the case of the foregoing length of 29 microns and width of 6.5 microns, the polarizer can achieve a better extinction ratio effect. In this embodiment, the electrode is at a top layer of the p-i-n junction. Specifically, the adjustable portion sequentially includes an Al/Cu electrode, an n+ Si layer, a SiGe alloy, and a p+ Si layer from top to bottom, thereby forming the p-i-n junction.

An absorption rate of the foregoing semiconductor material SiGe alloy may change as an external electric field changes. When the controller applies an external electric field to the Al/Cu electrode, an absorption coefficient, that is, the absorption rate, of the SiGe alloy for input light changes as the external electric field changes, thereby changing propagation paths of optical signals in different polarization states in the multi-mode waveguide and implementing a function of selection on a polarization state of an output optical signal.

Figure 6:
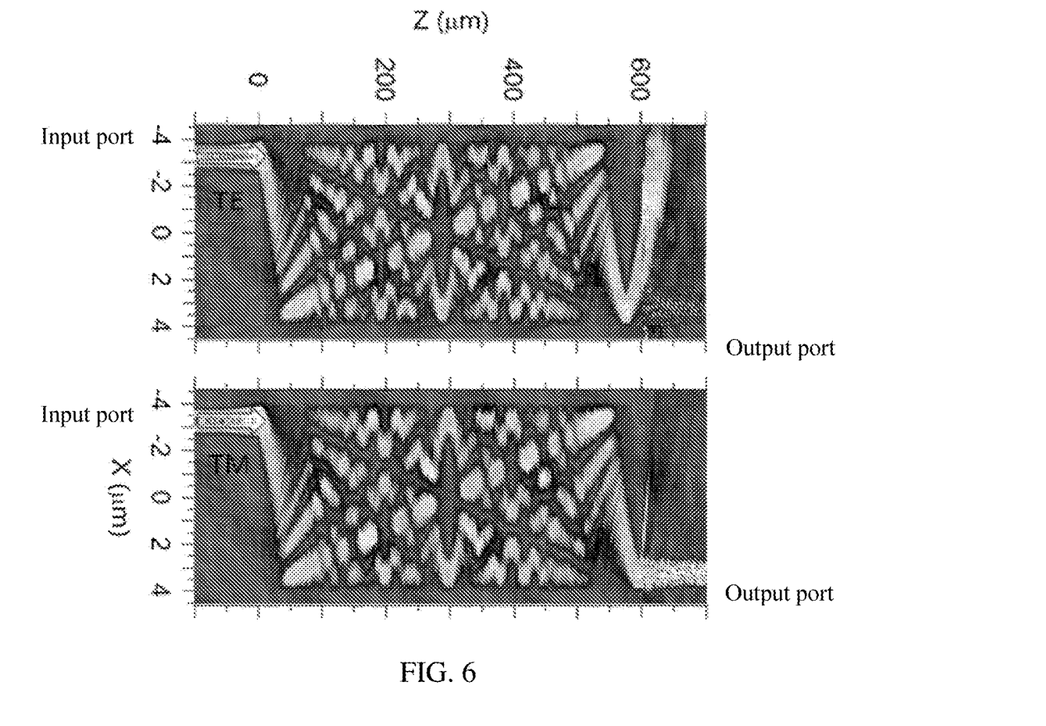
FIG. 6 is a schematic diagram 1 of emulation results of light fields in still another embodiment of a polarizer.

FIG. 6 is a schematic diagram 1 of emulation results of light fields in still another embodiment of a polarizer. FIG. 6 shows emulation results of light fields, which are in a 3D-BPM, of an MMI type polarizer that 1550 nm optical signals in TE and TM polarization states pass through when the controller applies no external electric field. It may be seen from FIG. 6 that, a TE mode is reflected before an output port of the output waveguide, and therefore the TE mode misses the output waveguide and is leaked into a coverage layer; and a self-imaging point of a TM mode is exactly located at the output port of the output waveguide, and therefore the TM mode is output from the output waveguide. In this case, the polarizer is used as a TM mode polarizer and has a polarization extinction ratio of 12 dB.

Figure 7:
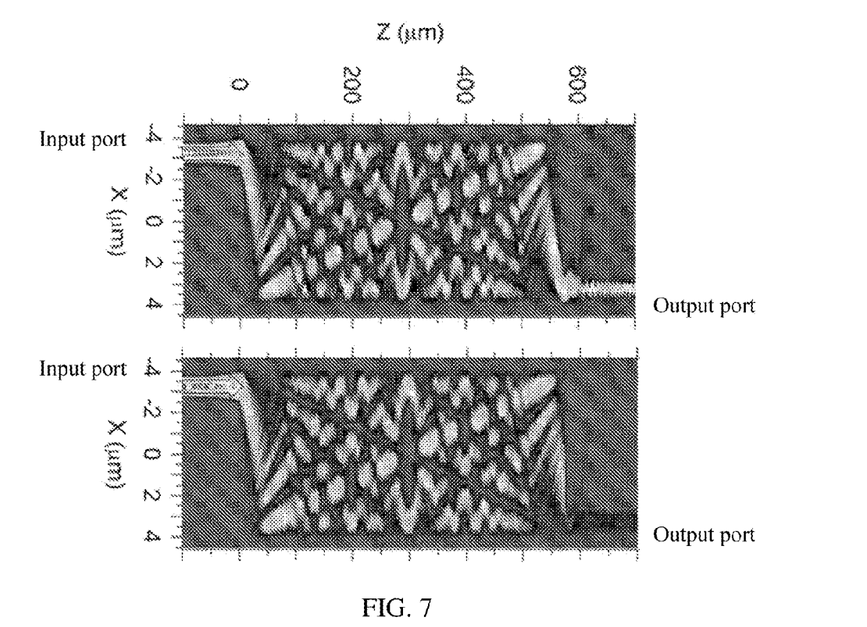
FIG. 7 is a schematic diagram 2 of emulation results of light fields in still another embodiment of a polarizer.

FIG. 7 is a schematic diagram 2 of emulation results of light fields in still another embodiment of a polarizer. FIG. 7 shows emulation results of light fields, in a 3D-BPM, of an MMI type polarizer that 1550 nm optical signals in TE and TM polarization states pass through when the controller applies an external electric field. It may be seen from FIG. 7 that, because of a property of strong absorption of the SiGe alloy under the external electric field, some of energy of light of a reflected TE mode is absorbed, and remaining energy is output from an output port; and during transmission, a TM mode is almost absorbed completely by the SiGe alloy and therefore cannot be output from the output waveguide. In this case, the polarizer is used as a TE mode polarizer and has a polarization extinction ratio of 7 dB.

Figure 8:
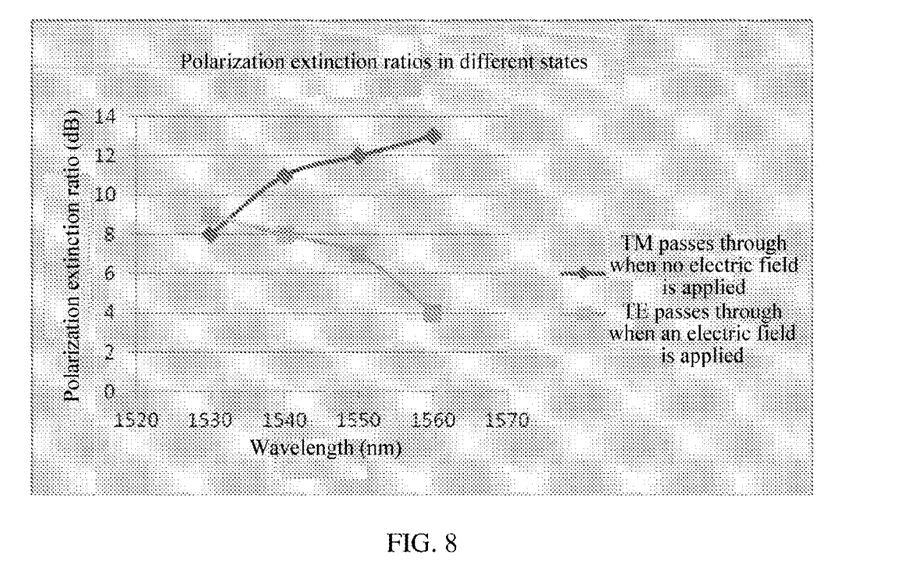
FIG. 8 is a schematic diagram of a polarization extinction ratio in still another embodiment of a polarizer.

FIG. 8 is a schematic diagram of a polarization extinction ratio in still another embodiment of a polarizer according to the present invention and shows polarization extinction ratios in two states in which an external electric field is applied to a communication band and no external electric field is applied to a communication band. It may be seen from FIG. 8 that, a polarization extinction ratio of a TM mode is around 11 dB, and a polarization extinction ratio of a TE mode is around 7 dB.

Embodiment 2

Figure 9:
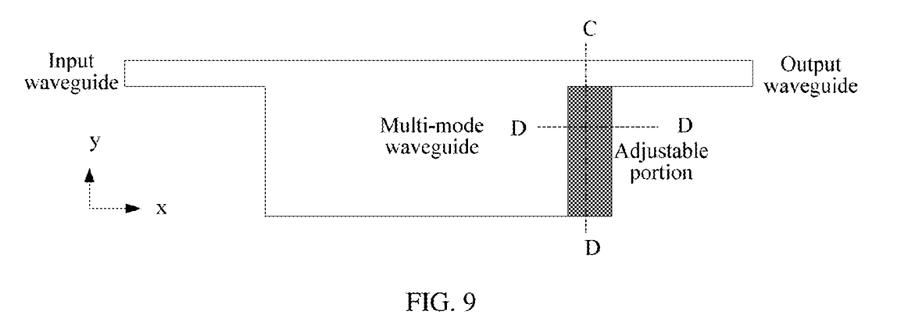
FIG. 9 is a schematic structural diagram of still another embodiment of a polarizer.
Figure 10:
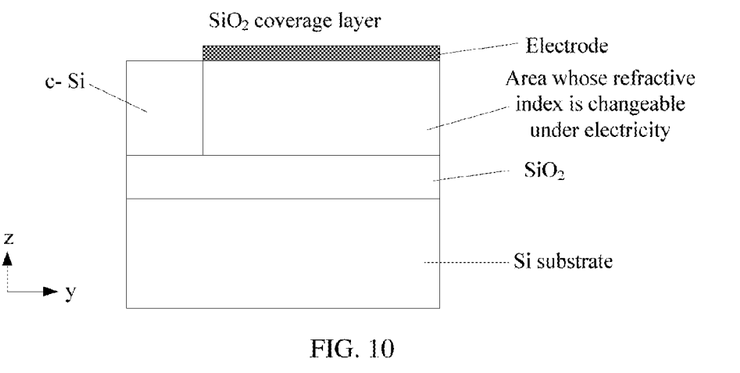
FIG. 10 is a sectional view along a C-C direction in FIG. 9.
Figure 11:
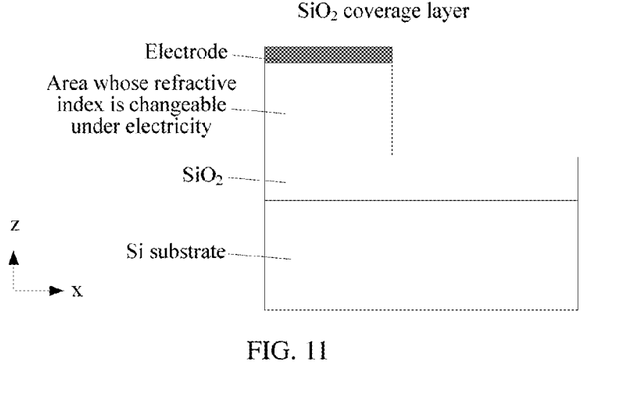
FIG. 11 is a sectional view along a D-D direction in FIG. 9.

FIG. 9 is a schematic structural diagram of still another embodiment of a polarizer, FIG. 10 is a sectional view along a C-C direction in FIG. 9, and FIG. 11 is a sectional view along a D-D direction in FIG. 9. The polarizer in this embodiment differs from the polarizer in Embodiment 1 in that, in an adjustable portion of an MMI multi-mode waveguide, the semiconductor material having a changeable absorption rate in Embodiment 1 is replaced with a material whose refractive index is changeable under an external electric field, so that the adjustable portion becomes an area whose refractive index may be changed by a controller by applying an electric field to an electrode. In addition, each of an input waveguide and an output waveguide in this embodiment may be a straight waveguide, a curved waveguide, a stripe waveguide, a ridge waveguide, a tapered waveguide, a slotted waveguide, or the like. An input waveguide and output waveguide shown in FIG. 9 are of a structure of a straight waveguide.

With reference to FIG. 9 to FIG. 11, specifically, the adjustable portion of the polarizer in this embodiment may also be designed to have a structure of a p-i-n junction, and certainly, may also be designed to have another structure rather than the p-i-n junction. The input waveguide, the output waveguide, and the multi-mode waveguide (the MMI multi-mode waveguide) are crystalline silicon (c-Si), and below a silicon layer, there are still a $SiO_2$ layer and a several-millimeter-thick silicon substrate. In this embodiment, the electrode is at a top layer. Below the electrode, there is a semiconductor material whose refractive index may change as an external electric field changes, such as Si or a III-V compound. These materials may form a refractive index changeable area, and the controller may change a refractive index of the area by applying a changing external electric field. Optionally, the refractive index changeable area below the electrode may include an n+ Si layer, a semiconductor material (a material whose refractive index is changeable under an external electric field), and a p+ Si layer.

According to the polarizer in this embodiment, the refractive index of the semiconductor material in the refractive index changeable area may change as an external electric field changes. When the controller applies an external electric field to the electrode, a refractive coefficient, that is, the refractive index, of the semiconductor material for input light changes as the external electric field changes, thereby changing propagation paths of optical signals in different polarization states in the multi-mode waveguide and implementing a function of selection on a polarization state of an output optical signal.

In addition, the MMI multi-mode waveguide, the input waveguide, and the output waveguide in this embodiment may be made by using a material such as a semiconductor, a polymer, $SiO_2$, or nitride. In this embodiment, a size of the adjustable portion, such as a length and a width of the semiconductor material, may be specifically set according to a used material, which is not limited in this embodiment.

Embodiment 3

In Embodiment 1 and Embodiment 2, the controller changes the absorption rate or refractive index of the adjustable portion by applying an electric field. In this embodiment, an adjustable portion in an MMI multi-mode waveguide may include a thermo-optical material (such as a polymer) or a magneto-optical material (such as an yttrium iron garnet). In this case, a controller may change a refractive index of the thermo-optical material or the magneto-optical material, an absorption rate of the thermo-optical material or the magneto-optical material, a magnetic conductivity of the thermo-optical material or magneto-optical material, or a light transmittance of the thermo-optical material or the magneto-optical material by applying a temperature field to the thermo-optical material or by applying a magnetic field to the magneto-optical material.

Figure 12:
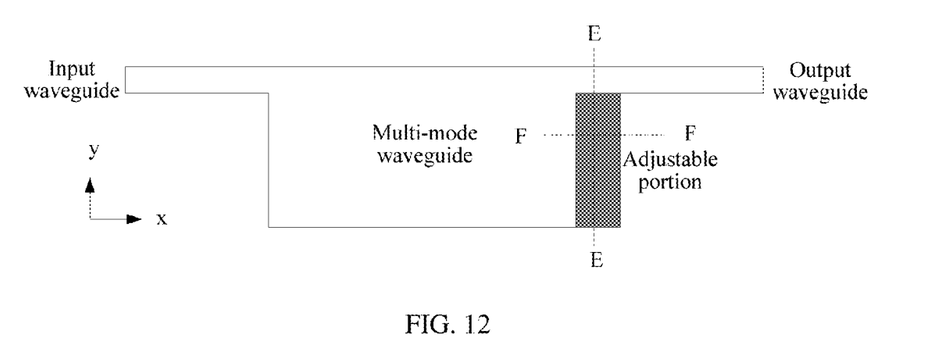
FIG. 12 is a schematic structural diagram of still another embodiment of a polarizer.
Figure 13:
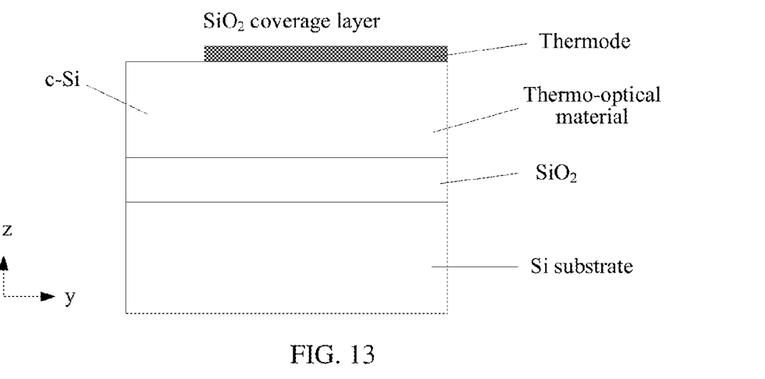
FIG. 13 is a sectional view along an E-E direction in FIG. 12.
Figure 14:
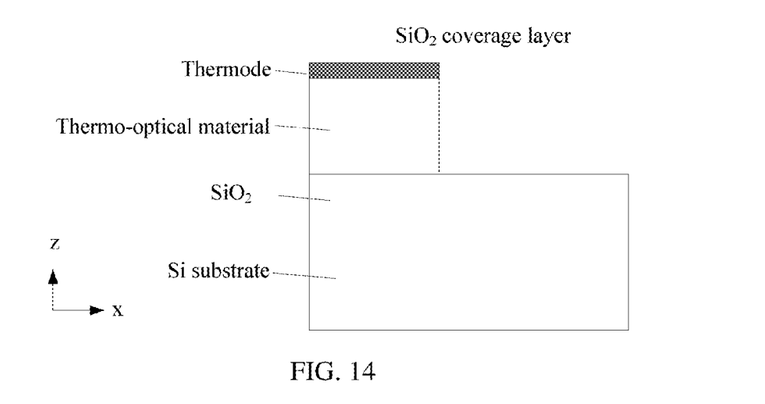
FIG. 14 is a sectional view along an F-F direction in FIG. 12.

FIG. 12 is a schematic structural diagram of still another embodiment of a polarizer, FIG. 13 is a sectional view along an E-E direction in FIG. 12, and FIG. 14 is a sectional view along an F-F direction in FIG. 12. The polarizer in this embodiment differs from the polarizer in Embodiment 2 in that, in the adjustable portion of the MMI multi-mode waveguide, the semiconductor material whose refractive index is changeable under electricity in Embodiment 2 is replaced with a thermo-optical material whose refractive index is changeable under an external thermal field, and the common electrode in Embodiment 2 is replaced with a thermode, so that the adjustable portion becomes an area whose refractive index may be changed by a controller by controlling a temperature of the thermode.

In addition, the thermode in this embodiment may also be replaced with a pair of magnetic poles, and the thermo-optical material in this embodiment may also be replaced with a magneto-optical material, so that the adjustable portion becomes an area whose refractive index may be changed by the controller by controlling a magnetic field of the magnetic poles.

Embodiment 4

Figure 15:
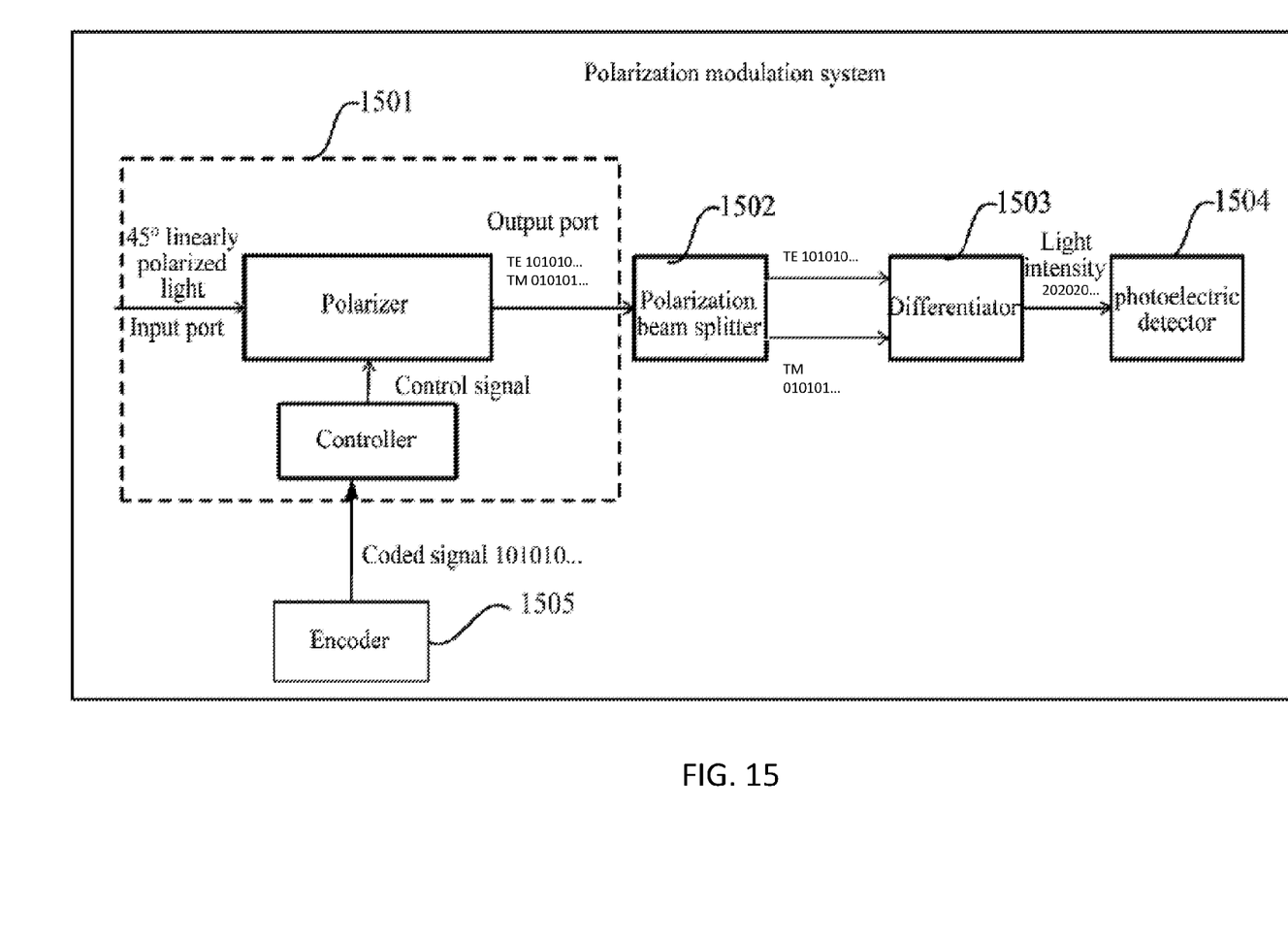
FIG. 15 is a schematic structural diagram of a polarization modulation system according to an embodiment.

Based on the polarizers according to the foregoing embodiments, this embodiment provides a polarization modulation system. FIG. 15 is a schematic structural diagram of an embodiment of a polarization modulation system according to the present invention. As shown in FIG. 15, the system may include a polarizer 1501, a polarization beam splitter 1502, a differentiator 1503, a photoelectric detector 1504, and an encoder 1505 that are sequentially connected, where the polarizer 1501 may be the polarizer according to any embodiment.

For the polarization beam splitter 1502, the differentiator 1503, the photoelectric detector 1504, and the encoder 1505 in this embodiment, reference may be made to various existing devices, which are not described in detail in this embodiment. In addition, the encoder 1505, the polarizer 1501, the polarization beam splitter 1502, the differentiator 1503, and the photoelectric detector 1504 are sequentially connected, and the connection manner thereof is not limited herein.

Specifically, for a flow direction of a signal of the polarization modulation system, reference may be made to FIG. 15. When 45° linearly polarized light enters the polarizer from an input port of the polarizer, the encoder 1505 applies a preset coded signal to a controller, and the controller applies a control signal, so that an output port of the polarizer outputs two channels of complementary signals that are in different polarization states (actually, a whole including the polarizer and the controller in FIG. 15 is a polarizer; in this embodiment, components in FIG. 15 are shown in a manner for ease of description, and a block that indicates the polarizer in FIG. 15 actually includes an MMI multi-mode waveguide, an input waveguide, and an output waveguide), that is, a TE mode is 101010 . . . and a TM mode is 010101 . . . . Then, the signals enter two channels after passing through the polarization beam splitter 1502, and a differential signal with a light intensity of 202020 . . . is produced in the differentiator 1503 and last is detected by the photoelectric detector 1504.

According to the polarization modulation system in this embodiment, a same channel of data is transmitted by means of two channels of optical signals that are in different polarization states, and last, a signal-to-noise ratio of an entire transmission system is improved by using a differentiator. Therefore, within a tolerance range of a PMD, an optical signal noise ratio (OSNR) of 3 dB can be improved.

Persons of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A polarizer, comprising:
a MMI multi-mode waveguide, wherein one side of the MMI multi-mode waveguide is connected to an input waveguide, and a second side is connected to an output waveguide, and wherein a width of the MMI multi-mode waveguide is larger than a width of the input waveguide and a width of the output waveguide in a plan view;
wherein an end portion of the side of the MMI multi-mode waveguide to which the output waveguide is connected is provided with an adjustable portion, and the adjustable portion is connected to the output waveguide; and
wherein the polarizer further comprises a controller connected to the adjustable portion, wherein the controller is configured to perform control to change a material property of the adjustable portion to control the output waveguide to output optical signals in different polarization states.

2. The polarizer according to claim 1, wherein the material property of the adjustable portion comprises one or more of the following: a refractive index of the adjustable portion, a magnetic conductivity of the adjustable portion, and a light transmittance of the adjustable portion.

3. The polarizer according to claim 2, wherein:
the adjustable portion comprises an electrode and a p-i-n junction; and
the controller is configured to change a refractive index, a magnetic conductivity, and/or a light transmittance of an area of the p-i-n junction of the adjustable portion by applying an electric field to the electrode.

4. The polarizer according to claim 3, wherein the p-i-n junction comprises a SiGe alloy, and the SiGe alloy has a length range of 25 to 35 microns and a width range of 5 to 7 microns.

5. The polarizer according to claim 4, wherein the SiGe alloy is 29 microns long and 6.5 microns wide.

6. The polarizer according to claim 2, wherein:
the adjustable portion comprises a thermo-optical material; and
the controller is configured to change a refractive index, a magnetic conductivity, and/or a light transmittance of the thermo-optical material by applying a temperature field to the thermo-optical material.

7. The polarizer according to claim 2, wherein:
the adjustable portion comprises a magneto-optical material; and
the controller is configured to change a refractive index, a magnetic conductivity, and/or a light transmittance of the magneto-optical material by applying a magnetic field to the magneto-optical material.

8. The polarizer according to claim 1, wherein the material property of the adjustable portion comprises an absorption rate of the adjustable portion.

9. The polarizer according to claim 8, wherein
the adjustable portion comprises an electrode and a p-i-n junction; and
the controller is configured to change an absorption rate of an area of the p-i-n junction of the adjustable portion by applying an electric field to the electrode.

10. The polarizer according to claim 9, wherein:
the adjustable portion comprises a thermo-optical material; and
the controller is configured to change an absorption rate of the thermo-optical material by applying a temperature field to the thermo-optical material.

11. The polarizer according to claim 9, wherein:
the adjustable portion comprises a magneto-optical material; and
the controller is configured to change an absorption rate of the magneto-optical material by applying a magnetic field to the magneto-optical material.

12. The polarizer according to claim 1, wherein the polarizer comprises a plurality of MMI multi-mode waveguides and a plurality of sub-polarizers, wherein each of the sub-polarizers comprises an MMI multi-mode waveguide, an input waveguide, and an output waveguide; and the plurality of sub-polarizers are cascaded.

13. A polarization modulation system, comprising a polarizer, an encoder, a polarization beam splitter, a differentiator, and a photoelectric detector;

wherein the encoder, the polarizer, the polarization beam splitter, the differentiator, and the photoelectric detector are sequentially connected;

wherein the polarizer comprises a MMI multi-mode waveguide, wherein one side of the MMI multi-mode waveguide is connected to an input waveguide, and a second side is connected to an output waveguide, and wherein the MMI multi-mode waveguide comprises a guiding layer that is configured to guide a wave;

wherein an end portion of the side of the MMI multi-mode waveguide to which the output waveguide is connected is provided with an adjustable portion, and the adjustable portion defines a sidewall of the guiding layer and is connected to the output waveguide; and wherein the polarizer further comprises a controller connected to the adjustable portion, wherein the controller is configured to perform control to change a material property of the adjustable portion to control the output waveguide to output optical signals in different polarization states.

14. The polarization modulation system according to claim 13, wherein the material property of the adjustable portion comprises one or more of the following: a refractive index of the adjustable portion, a magnetic conductivity of the adjustable portion, and a light transmittance of the adjustable portion.

15. The polarizer according to claim 14, wherein:
the adjustable portion comprises an electrode and a p-i-n junction; and
the controller is configured to change a refractive index, a magnetic conductivity, and/or a light transmittance of an area of the p-i-n junction of the adjustable portion by applying an electric field to the electrode.

16. The polarizer according to claim 15, wherein the p-i-n junction comprises a SiGe alloy, and the SiGe alloy has a length range of 25 to 35 microns and a width range of 5 to 7 microns.

17. The polarizer according to claim 16, wherein the SiGe alloy is 29 microns long and 6.5 microns wide.

18. The polarizer according to claim 14, wherein:
the adjustable portion comprises a thermo-optical material; and
the controller is configured to change a refractive index, a magnetic conductivity, and/or a light transmittance of the thermo-optical material by applying a temperature field to the thermo-optical material.

19. The polarizer according to claim 14, wherein:
the adjustable portion comprises a magneto-optical material; and
the controller is configured to change a refractive index, a magnetic conductivity, and/or a light transmittance of the magneto-optical material by applying a magnetic field to the magneto-optical material.

20. A method of forming a polarizer, comprising:
providing a planar MMI multi-mode waveguide;
connecting one side of the planar MMI multi-mode waveguide to an input waveguide, and connecting a second side to an output waveguide, wherein the planar MMI multi-mode waveguide, the input waveguide, and the output waveguide are disposed on a same layer of a semiconductor substrate;
providing an end portion of the side of the planar MMI multi-mode waveguide to which the output waveguide is connected with an adjustable portion, and connecting the adjustable portion to the output waveguide, wherein the adjustable portion comprises an electrode layer over one or more adjustable layers, the one or more adjustable layers define a sidewall of a guide layer of the planar MMI multi-mode waveguide, and the sidewall extends in a direction that is substantially perpendicular to a direction of propagation of the output waveguide; and
connecting a controller to the adjustable portion, wherein the controller is configured to apply an electrical signal to the electrode layer to change a material property of the one or more adjustable layers of the adjustable portion to control the output waveguide to output optical signals in different polarization states.

* * * * *